A. A. POSPYCHALA.
UTENSIL LIFTER.
APPLICATION FILED APR. 8, 1914.
1,112,475. Patented Oct. 6, 1914.
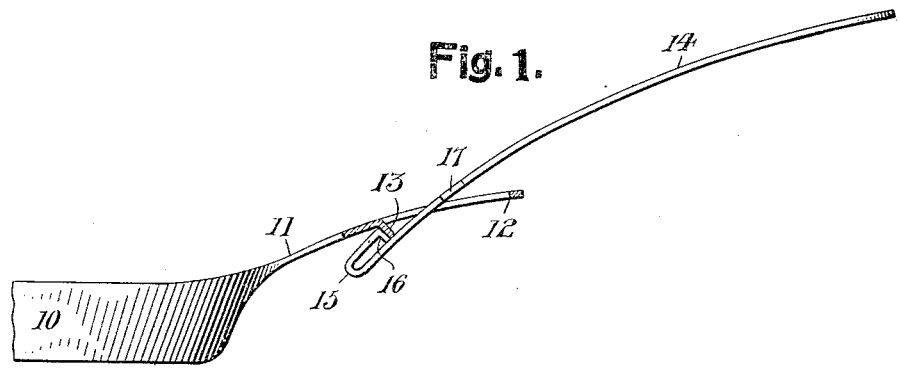
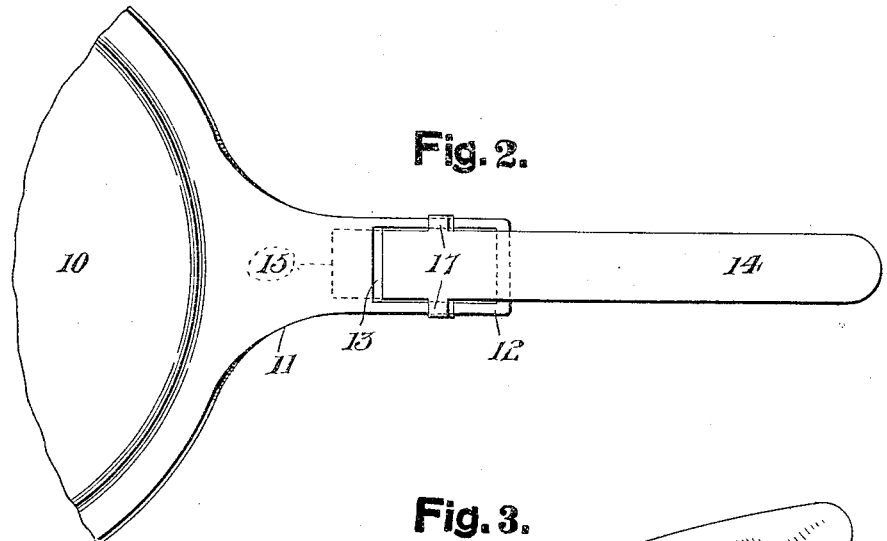
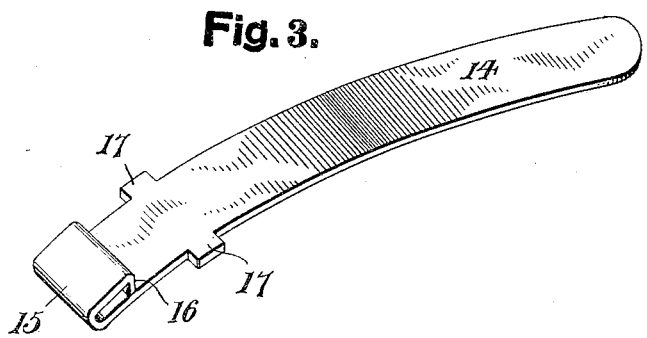
Witnesses
Inventor
A. A. Pospychala

UNITED STATES PATENT OFFICE.

ANTHONY A. POSPYCHALA, OF WHITING, INDIANA.

UTENSIL-LIFTER.

1,112,475. Specification of Letters Patent. Patented Oct. 6, 1914.

Application filed April 8, 1914. Serial No. 830,409.

*To all whom it may concern:*

Be it known that I, ANTHONY A. POSPYCHALA, a citizen of the United States, and residing at Whiting, in the county of Lake and State of Indiana, have invented certain new and useful Improvements in Utensil-Lifters, of which the following is a specification.

This invention relates to certain new and useful improvements in utensil lifters.

An object of the device is to provide a removable handle readily engageable with a cooking utensil employed upon or within a stove and whereby the hand of the operator is not required to come in contact with the heated utensil in removing the same from the stove.

A further object is to provide a utensil such as a spider or skillet with a lifting handle readily attached to and detached from the utensil and whereby it is unnecessary for the hand of the operator to come in direct contact with the utensil.

A still further object is to provide a cooking utensil with a perforated projection of such a form as to be engaged by a removable handle, and such elements being of such structures as to be easily and inexpensively manufactured.

With these and other objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating numerals refer to corresponding parts throughout the several views:—Figure 1 is a side elevation of a spider provided with the present lifting handle, parts being broken away. Fig. 2 is a top plan view thereof, and, Fig. 3 is a perspective view of the handle detached.

Referring more in detail to the drawing, the cooking utensil or spider 10 is provided with a short projecting handle 11 having a substantially rectangular perforation or struck-out portion or slot 12 formed therein and having at the inner end of said slot an inclined downwardly-extending flange 13 formed by downwardly bending a portion of the metal of the handle 11. A lifter or handle 14 consists of a strip of metal having one end thereof formed into a roll 15 providing a flat inner end 16 angularly positioned with respect to the upper face of the handle. Oppositely-projecting lugs 17 are formed upon the handle at a point slightly removed from the end roll 15 thereof. With any manner of utensil or article being provided with such a slot and flange, the lifting handle 14 being of slightly less width than the width of the slot 12, is adapted to be inserted therein with the face 16 of the terminal roll engaging the front side of the flange 13 as illustrated in Fig. 1, and with the lugs 17 resting on the top of the utensil handle 11 at the slotted portion thereof. In such a position it is evident that the utensil may be readily elevated and conveyed as desired, while by moving the lifter handle 14 relatively to the utensil handle 11, the member 14 is readily removed from the receiving slot and disengaged from the utensil. By such construction, it is evident that the lifting handle may be kept at a distance from the stove and although the utensil and its handle becomes exceedingly hot, the utensil may be readily manipulated by the employment of such lifting handle 14.

While the forms of the invention herein shown and described are what are believed to be preferable embodiments of the invention, it is nevertheless to be understood that various forms and modifications may be had without departing from the spirit and scope of the invention as claimed.

What is claimed is:—

1. A device of the class described, comprising in combination with a utensil having a projection provided with a longitudinal slot and a downwardly projecting flange at the inner end of said slot, a removable handle comprising a single strip of metal rolled over upon itself at one end and having oppositely projecting lugs slightly removed from said end, the said rolled over end being adapted for insertion through said slot, whereby said rolled end and said flange may be brought into seating engagement.

2. A device of the class described, comprising a utensil, a projecting handle upon said utensil having a longitudinal slot therethrough, a portion of said handle being downwardly bent forming an angular flange at the inner end of said slot, a one-piece lifter, a rolled-over end upon said lifter forming a face angularly positioned with respect to said lifter, outwardly-projecting lugs upon said lifter slightly removed from said rolled-over end thereof, the width of said lifter being less than the width of said slot and whereby the rolled over end of the lifter is adapted for insertion through said slot with seating engagement of said face with the under surface of said flange and with said lugs engageably positioned above said utensil handle at opposite sides of said slot.

In testimony whereof I affix my signature in presence of two witnesses.

ANTHONY A. POSPYCHALA.

Witnesses:
FRANCIS B. CERAJENSKI,
STEVE SOBIESKI.